March 7, 1961  C. W. HARRIS  2,974,230
OPTICAL DETECTOR

Filed Feb. 9, 1955  5 Sheets-Sheet 1

INVENTOR.
CLYDE W HARRIS

BY D. Gordon Angus
ATTORNEY

March 7, 1961 C. W. HARRIS 2,974,230
OPTICAL DETECTOR
Filed Feb. 9, 1955 5 Sheets-Sheet 2

INVENTOR.
C.W. Harris
BY
D. Gordon Angus
ATTORNEY

March 7, 1961  C. W. HARRIS  2,974,230
OPTICAL DETECTOR

Filed Feb. 9, 1955  5 Sheets-Sheet 3

INVENTOR.
C. W. Harris

BY
D. Gordon Angus
ATTORNEY

March 7, 1961  C. W. HARRIS  2,974,230
OPTICAL DETECTOR

Filed Feb. 9, 1955  5 Sheets-Sheet 5

INVENTOR.
C.W. Harris

BY D. Gordon Angus
ATTORNEY

United States Patent Office 2,974,230
Patented Mar. 7, 1961

2,974,230

OPTICAL DETECTOR

Clyde W. Harris, Duarte, Calif., assignor to Aerojet-General Corporation, Azusa, Calif., a corporation of Ohio Filed Feb. 9, 1955, Ser. No. 487,156

10 Claims. (Cl. 250—83.3)

This invention relates to apparatus for indicating the position of a source of radiant energy, and in particular to means for indicating the position of the source by a presentation in the form of an image of another kind of radiation.

An object of this invention is to enable an object which radiates some form of energy which may be invisible, such as infrared, to be tracked or sighted on by a presentation in another form of energy such as visible light for example. An allied object is to provide an image converter for this purpose which dispenses with the complex electronic circuitry required in conventional tracking devices, and which can have relatively wide manufacturing tolerances.

This application is a continuation-in-part of my co-pending application Serial Number 396,089, filed December 4, 1953, now abandoned, entitled "Optical Device."

A feature of the invention resides in a moving reticle, some areas of which permit the passage of radiant energy and some areas of which are opaque thereto, this reticle standing in the path of radiant energy being detected. Radiant energy passing through the reticle excites a detector which in turn causes modulation of a source of visible light. Suitable synchronized moving reticle means are positioned in the optical path between the source of visible light and an observer. The eye will thereupon perceive an image of visible light which corresponds in field position with the image comprised of detected energy.

An optional feature of the invention resides in the coincidence within the device of both the visible and the radiant rays, and the selective control of both types of rays by the same reticle.

Another optional feature resides in a moving reticle having transparent slits in another opaque surface so constructed and arranged that a cross will be seen by an observer at the location of the infrared image in the field being viewed.

According to another optional feature, sighting means are provided whereby synchronized reticle means pass between the source of the radiation being detected and a detector, and also between a source of visible light and an eyepiece, with the detected radiation and the visible light taking different optical paths.

The above and other features of the invention will be fully understood from the following detailed description and the accompanying drawings of which:

Figure 5:
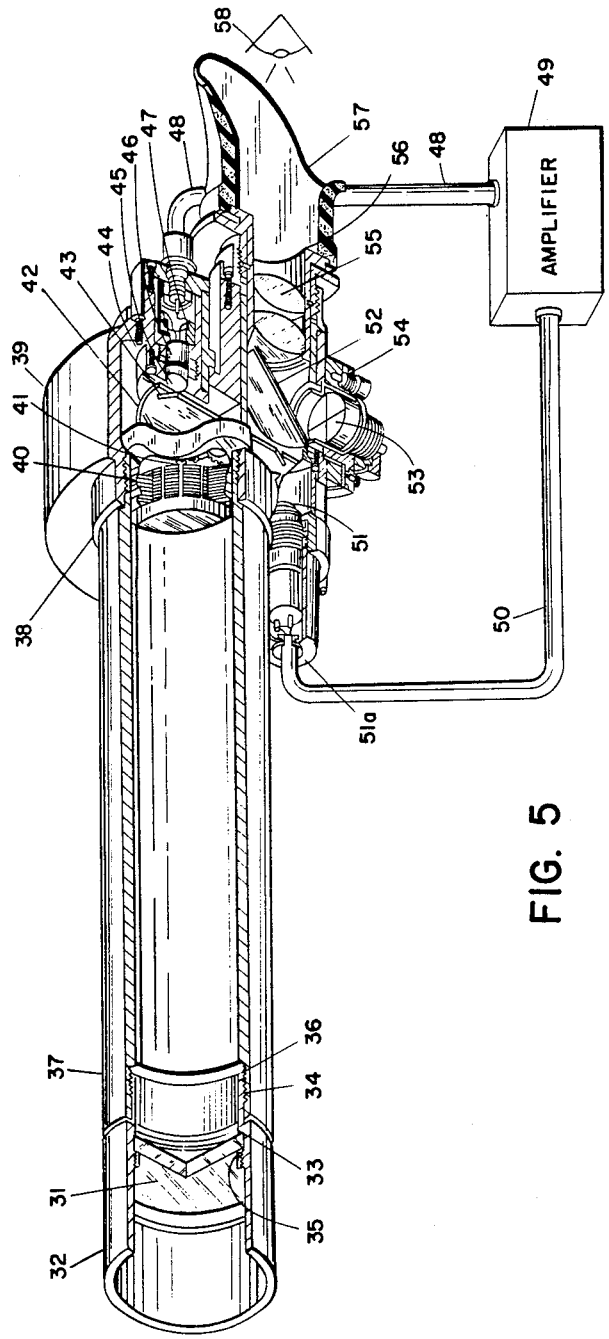
Fig. 5 is a perspective view, partly cutaway, of a gun sight incorporating an optical system according to the invention.
Figure 11:
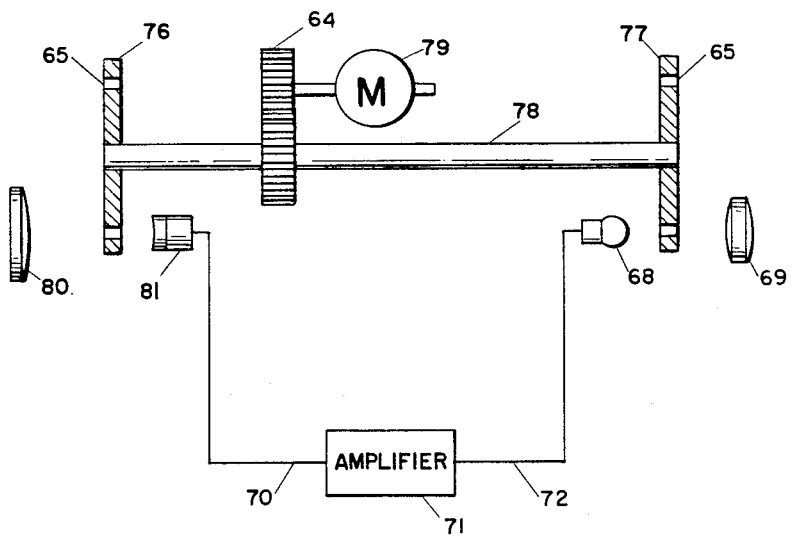

Figs. 7–10 inclusive are schematic views of the optical system of Fig. 5 in four successive operational conditions; and Fig. 11 is a schematic drawing of another embodiment of a gunsight incorporating the optical system of the invention.

Figure 1:
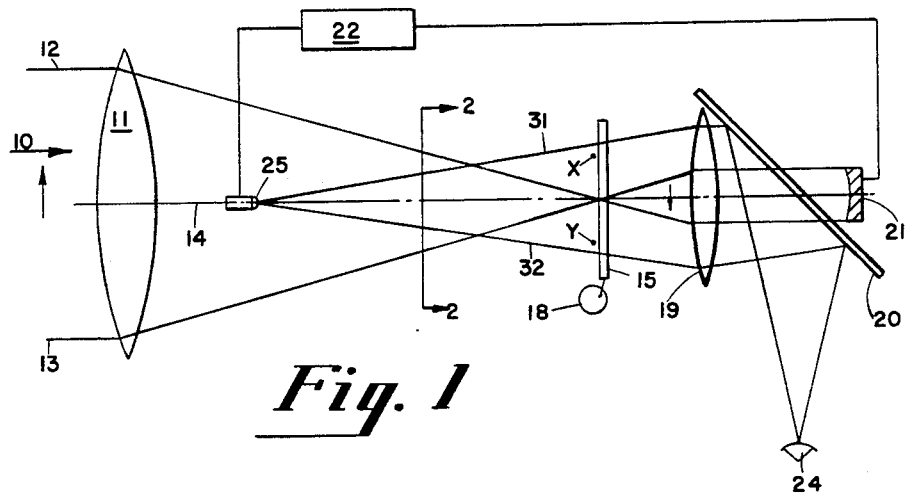
Fig. 1 is a side elevation of the optical system according to the present invention.
Figure 2:
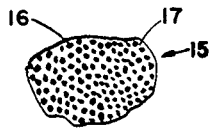
Fig. 2 is a fragmentary elevation of a preferred type of moving reticle for the system of Fig. 1 as viewed along line 2—2 of Fig. 1.

In Fig. 1, a ray 10 represents an infrared image impinging upon the device, it being understood that the ray shown represents a relatively concentrated infrared image disposed against a "cold" black background, actually comprising a small "bundle" of rays. Infrared rays first encounter a double convex transparent lens 11 which serves to produce a sharper image. Lines 12 and 13 are arbitrary lines representing a sample optical path, and line 14 is the optical central axis of the system. The converging rays from lens 11 strike a reticle 15 made of material which is transparent to both infrared and visible light, such as glass, quartz, or fluorite. The reticle is preferably a plane sheet of this material of uniform thickness. The surface of the reticle is partly covered with small opaque regions distributed in a random manner so that about half of the reticle is transparent and the other half is opaque. In Fig. 2, the opaque regions are generally denoted by spots 16 and the transparent regions by areas 17. Such spots may be obtained by spraying paint on the surface of the reticle and are generally less than $\frac{1}{64}''$ in their largest dimension. The illustration of Fig. 2 is not intended to show a pattern to be repeated over the entire surface of the reticle, since the distribution of the opaque and transparent regions in this reticle is to be random. However, any reasonable large area should include approximately the same proportions of transparent and opaque regions as any other area of similar size. In the preferred embodiment shown, the reticle is approximately 50% opaque, although, as will be understood from the discussion to follow, this proportion is not in any way a limitation. The percentage of the surface which is opaque simply determines the degree of contrast of the visible image against its background.

The reticle is caused to oscillate in its plane back and forth in the path of the infrared rays by an eccentric device 18. Rays passing through the transparent parts of the reticle next impinge upon a converging lens 19 which causes the image to converge.

A germanium coated mirror 20, of the type which is transparent to infrared rays, but reflective to visible light rays is inserted in the path of the rays at a 45° angle to central axis 14. Such a mirror is commonly made by condensing a very thin layer of metallic germanium onto a glass backing surface. Substances such as fluorite may be more suitable than glass, being transparent farther into the infrared spectrum. Behind this mirror, an infrared detector 21, such as a common lead sulfide cell, intercepts the infrared rays which have passed through the reticle and the mirror. This detector generates or controls a small current when excited by infrared rays, the current intensity being proportional to the excitation.

Current from the detector is amplified by an amplifier 22, of conventional construction which requires no description here. Current from the amplifier modulates the intensity of light emanated by light source 25 placed on the central axis. This light source is of a type wherein the luminar intensity modulates quickly with a change in voltage, a well-known example being a neon glow lamp. An observer 24 views the visible light reflected from the germanium mirror at one side of the system. Lines 31 and 32 are the outermost boundaries of the light shone from source 25.

Figure 3:
Fig. 3 is a fragmentary view of a portion of an alternative embodiment of a moving reticle for use in the optical system of Fig. 1.

Fig. 3 shows an alternate form of reticle, in which transparent regions 25, at 90° to each other, are formed between opaque regions 26 on a flat sheet of the same material as reticle 15. Such a pattern may be obtained by applying masking tape to the sheet in strips and then painting or spraying the entire surface until the unmasked areas are opaque, and then stripping off the masking tape. This reticle should be moved linearly in its own plane in operation. The slits should be separated so that only one will be in the image field at any one time.

Figure 4:
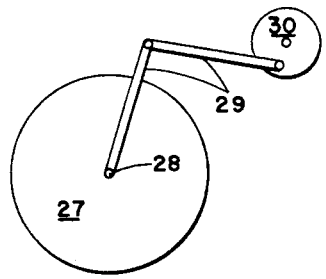
Fig. 4 is a side elevation of another means for mounting and moving the reticle shown in Fig. 2.

Fig. 4 shows a means by which the reticle of Fig. 2 may be rotated or nutated in the path of the infrared rays. The reticle 27 (shown without its opaque and transparent regions) is mounted at pivot 28. Crank arms 29 are moved back and forth by eccentric device 30. Adjustment of the lengths of the arms and eccentric permit the reticle either to be nutated through an angle or continuously rotated, whichever is preferred.

The image converter, or gunsight, shown in Fig. 5 has an objective lens 31 for receiving and focussing radiation to be detected, and which is held in a cylindrical objective lens holder 32 having an internal shoulder 33 and external threads 34 near one end. The objective lens may be of double-convex configuration, and is held against the shoulder by a retaining ring 35 threaded into the lens holder. The lens holder itself is screwed into mating threads 36 inside a cylindrical sighting tube 37. The sighting tube is threaded into a boss 38 on a housing 39.

Within this housing there is mounted a scanning disc drive motor 40. A gear train 41 interconnects the drive motor 40 and a rotatably mounted opaque scanning disc 42, which will be sometimes referred to herein as a moving reticle. The scanning disc is preferably mounted so that its plane is substantially perpendicular to the axis of the sighting tube. It is provided with spaced perforations, which are preferably in the shape of slits 43 positioned in pairs. Pairs of slits are disposed diametrically across the disc from each other, and are disposed on a circle around the center of rotation of the disc; that is, they are substantially equidistant from, and are uniformly spaced around, said center.

These slits are so disposed and arranged that they will pass in succession across the central axis of the sighting tube when the disc is rotated. The members of each pair of slits are oppositely slanted so as to converge toward the periphery of the disc.

The housing is generally hollow, and within it there is a hollow field lens holder 44 which holds a double-convex field lens 45 substantially on the axis of the sighting tube, and on the opposite side of the scanning disc from the sighting tube. A radiation detector 46, which may be such as a lead sulfide cell if the radiation to be detected is infrared, is mounted on the same axis as the field lens, and on the opposite side of the field lens from the scanning disc. The detector may be of any other variety sensitive to the radiation to be detected, such as ultra-violet radiation, for example. It may even be desired to construct the gun sight simply to change the color of received visible light. Other examples of satisfactory detectors are photoconductors, photo emissive detectors, or thermal detectors. This detector is held by a retainer 47 which fits within the field lens holder.

Leads 48 from the detector are connected to an amplifier and power supply 49, from which other leads 50 are interconnected with a slit illuminating lamp 51. The current requirements are modest and the electrical demands can be met by battery power. The slit illuminating lamp is mounted to the housing so as to shine upon the scaning disc from one side thereof. The preferable arrangement is as shown, wherein the slit illuminating lamp is disposed on the same side of the disc as the sighting tube. The lamp may be of any convenient type which quickly turns on and off in response to a signal. A typical example is a neon glow lamp.

The field lens and the slit illuminating lamp are conveniently located at diametrically opposite positions across the surface of the disc. In order to provide similar positioning between the position of the images in an eyepiece and in the objective lens, the two should be placed so that slits are centered on the axes of the scanning tube and the slit illuminating lamp at the same moment. That is, they should be angularly spaced from each other by some multiple of the angular spacing between pairs of slits. The illuminating lamp is conveniently mounted by means of a holder 51a which may be screwed into the housing.

A semi-reflecting mirror 52 is provided on the side of the scanning disc opposite the slit illuminating lamp. This is a well-known type of mirror which transmits part and reflects part of the light rays incident upon it. An illuminated reference reticle 53 comprises a glass disc with a cross-mark upon it. This reference reticle is illuminated by a reticle lamp 54 which comprises any convenient type of lamp, and which may be incandescent if desired. The semi-reflecting mirror 52 is mounted in the housing at an angle, preferably 45°, to the reference reticle.

Eyepiece lenses 55 are provided in a tube 56, and both are aligned with the slit illuminating lamp, and with the slits in the scanning disc so that the slits will pass between the slit illuminating lamp and the eyepiece lenses. For the comfort of the operator, an eyepiece 57, which may be of soft rubber, is provided for positioning the eye 58 of an observer.

There are two paths for radiation in this system: a first path between the object and the fields lens, and a second path between the illuminating lamp and the eyepiece. In the embodiment of Fig. 5, these paths are laterally displaced from each other, and have entirely separate routes.

Figure 6:
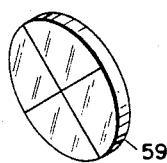
Fig. 6 is a fragmentary view showing a reference reticle assembly which may be used in place of the reference reticle shown in Fig. 5.

A reference reticle means which can be used alternatively to the reference reticle 53 in the device shown in Fig. 5, is shown in Fig. 6. This reference reticle simply comprises a transparent glass plate 59 with a scribed cross thereon to serve as reference means. When this type of reticle is used, an objective lens 75 is substituted in place of the semi-reflecting mirror to focus the image on the reticle 59. The objective lens and reference reticle are installed directly in the optical path between the slit illuminating lamp and the eyepiece lenses, with the cross of the reticle centered on that path. The visible light then passes directly through the reference reticle. This permits the omission of the illuminated reference reticle 53 and the semi-reflecting mirror 52. This arrangement is shown in Figs. 7–10.

Fig. 11 schematically illustrates still another embodiment according to the invention which can be utilized for such purposes as gun sights. A moving reticle for this system comprises two discs 76, 77 which are joined by a shaft 78 which is driven by a motor 79 through gearing 64. The discs each have regions permitting the passage of radiant energy, and regions which do not permit said passage. As illustrated, slits 65 are provided in both discs to permit passage of energy, and the slits are similarly positioned angularly in both discs. Since the discs are interconnected, the slits are synchronized as between the two discs.

Reticle disc 76 is disposed between an objective lens 80 and a detector 81, which may be similar to lens 31 and detector 46, respectively, of Fig. 5. Reticle disc 77 is disposed between a slit illuminating lamp 68 and an eyepiece 69, which may be similar to lamp 51 and eyepiece lens 55, respectively, of Fig. 5.

Electrical leads 70 provide the current from detector 81 to an amplifier 71, which may be used if desired, and leads 72 provide the amplified current to the slit illuminating lamp.

It will be appreciated that with the illustrated arrangement, the optical paths of the detected energy, and of the visible light from the slit illuminating lamp, may be disposed separately from each other, and also in line with each other. Other relative spacings in the two optical paths will readily be perceived.

In the operation of transforming an invisible infrared image into a visible image by the device of the invention shown in Fig. 1, the oscillation of the reticle is begun by actuating the eccentric device 18. As will later become evident, it is unnecessary that the direction of movement of the reticles of Figs. 1, 2 and 4 be regular, nor that any steady or given speed of oscillation or rotation be maintained. A nutating, rotating or oscillatory movement, or any combination of them may be used, but the movement should preferably be principally in the plane of the reticle. As will be seen, the operation of the device depends on the blocking off of rays by the opaque regions of the reticle. Motion of the reticle in the direction of the central axis is less effective for this purpose than is motion in the plane of the reticle.

Consider the infrared ray 10 which impinges on the reticle at some location denoted as X in Fig. 1. This ray will be considered a component part of an infrared image to be transformed into a visible image. Depending on the position of the reticle, and on the local dispersion of opaque and transparent regions, the surface of the reticle which at the moment is at location X might be either transparent or opaque. Statistically, the chances are 50% either way when the preferred reticle is used having a surface 50% of which is opaque and the remainder transparent. Assume for a moment that when the ray 10 reaches location X, the reticle at location X is transparent. In that event ray 10 will pass through the reticle and the mirror 20, and strike the detector, thereby exciting it. The current thus produced in the detector is then amplified and conducted to the light source, which it brightens. The light source may already be on, if desired, or simply turned on by the current from the detector, this feature being governed by the contrast desired in the visible image. This means that there will be a source of visible light at the central axis of the system directed toward the reticle. Examination of Fig. 1 will show that visible rays from this light source are shone over the entire surface area of the reticle where infrared rays may strike. This area is defined by the limiting rays 31 and 32. Therefore the modulated light from the source 25 will shine through every transparent portion of the reticle within these bounds.

Had the location X, where the arbitrarily selected infrared ray approached the reticle happened to be opposite an opaque region at the moment, no infrared ray could have gotten through the reticle. Therefore, assuming for a moment that a small image consists of a single ray 10, the ray will get through the reticle to excite the detector 21 only half the time, since it is equally probable that the ray will strike an opaque region as a transparent region. But more important, the single ray will then also be the sole cause of excitation of the detector cell and of modulation of the light source. Modulation of the source 25 occurs quickly, and therefore at the particular moment that infrared rays shine through the reticle at location X, visible light rays also shine through at that same location. This visible light ray falls on the mirror at a position corresponding to the position of the infrared ray in the field, and is so seen by the observer.

While the light source 25 is emitting visible light, about half of the surface of the mirror behind the reticle is illuminated. Since the reticle is in constant motion, light passing through the same transparent region will fall upon different points on the mirror at different times. This feature has the corollary result that a given spot on the mirror will be blocked off from the visible light source part of the time, and be able to "see" the visible light source another part of the time. Of course, the light source is not always "on," so even though the light source could be "seen" from a given point on the mirror, it does not follow that that point would be illuminated.

Location Y is a randomly selected point at which there is no impinging infrared ray from an image in the field. Opposite to this location Y, there is the same 50% chance as before that the reticle will be transparent at any given time. Thus, when the light source is being modulated, there is only a 50% chance that the modulated visible light will pass through the reticle at location Y, when it is on, that is, less than half of the time. The visible light from the source 25 which shines on parts of the mirror not corresponding to an image position will be visible to the observer as a dim background field. It has already been shown that in the case of location X, or any other location where an infrared ray strikes, a ray of visible light always passes through the reticle there when the reticle at that point is transparent, since it is the very passage of the infrared ray which brightens the light source 25 in the first place. Therefore the point or points corresponding to those where infrared rays impinge on the reticle will always be brighter than the rest of the field. Since ray 10 and locations X and Y were chosen at random, the same effects described for them will also pertain for all impinging rays and for all regions of the reticle and the mirror. Therefore an image will be shown up by the accumulation of the effects of many rays similar to ray 10 above.

If desired, the modulation of light source 25 could be reversed by reversing the polarity of the amplifier, whereby the amplified current would dim the intensity of a glowing light source instead of brightening it. This would result in an image comprising a dark spot against a lighter field, rather than the bright spot against the darker field as above.

It will now be appreciated that the reticle must be kept in motion. The distribution of the opaque spots being random, no regularity of displacement or rate of oscillation need be maintained. In fact, the reticle can as well be part of the surface of a rotating or nutating disc (Fig. 4).

The reticle of Fig. 3 is an interesting variation of the reticle, in which the image will be shown as a cross upon a field. This reticle may be moved back and forth in its own plane across the path of the rays, so that the clear portions are disposed at 45° to the line of motion, although this is not a necessary limitation. The light which shines through this reticle will be aligned in intersecting paths, to form a cross centered at the location of the infrared source in the field, the transparent slits 25 corresponding to opaque areas 16. Tilting the reticle simply tilts the cross, without shifting its center.

The system of Fig. 1 for transforming images of detected energy to visible images described above requires no attention to registration. The electronic system comprises only a detector for infrared rays and a light source modulated by current from the detector with the aid of an amplifier if desired. Contrast and intensity may be varied by adjusting the steady level of the light source, or by substituting reticles with more or fewer opaque regions. The manufacture and assembly of this device is far simpler than conventional devices such as scanners, due to the almost complete lack of critical dimensions. The infrared and visible rays shining through the reticle will always be in phase, while other visible rays not associated with a region where infrared rays strike the reticle may not be in phase. This fact also results in discrimination between large diffuse sources of infrared rays and more intense small bodies. In addition, the presentation is continuous, which is much faster than the rate provided by scanning devices, for instance. The eye will perceive the image of the target being scanned and will see the target in the form of visible light reflected from the germanium mirror which visible image is a direct substitution for the invisible infrared image.

The operation of the tracking devices of Figs. 5 and 11 will be best understood by reference to Figs. 7-10. These drawings show the operation of the device with the scanning disc in four successive operational positions. A purpose of the device is to provide an indication of the position of an object in the field of the objective lens. A typical observed object is an airplane 60, shown disproportionately large with respect to the field for purpose of illustration. The radiation from the object will be concentrated on a small part of the field, particularly when the object is a significant distance from the gun sight. The radiation to be detected, and which will betray the position of the object, may be such as the infrared radiation from the exhaust of the reciprocating engines, or the flame from a jet engine. Alternatively, and depending on the nature of the object being tracked, the radiation might be visible light, or any other kind of radiation.

Figure 7:
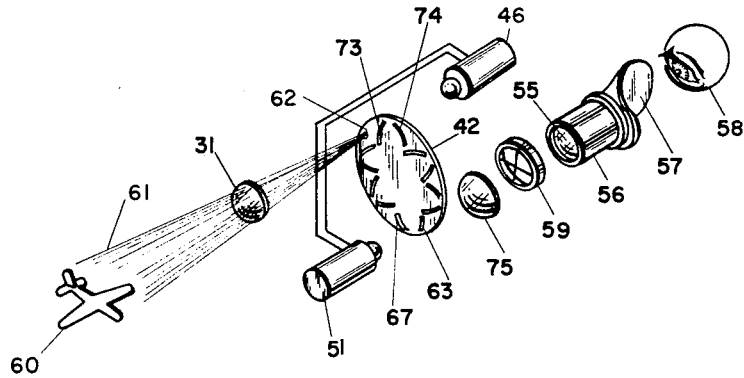

In Fig. 7, the radiation rays 61 from the airplane are shown concentrated by the objective lines at a spot 62 on the rotating scanning disc. At the momentary position of the disc shown in Fig. 7, this spot of concentrated rays falls on an imperforate part of the scanning disc, and no radiation passes the scanning disc to reach the detector. Therefore the detector sends no signal to the amplifier, and the slit illuminating lamp is dark. No light will then be seen in the eyepiece.

When the scanning disc is in operation, it is turned at some speed, say 150 r.p.m., so that there will be a slit at any given position a number of times per minute equal to the revolutions per minute times the number of slits in the disc. This rate is preferably about twelve slits per second. The slits are so spaced in the disc, and the scanning tube and illuminating lamp are so angularly spaced from each other, so that whenever there is a slit in the path of the rays from the objective lens, there is also a slit in a corresponding position in the field viewed by the eyepiece.

Figure 8:
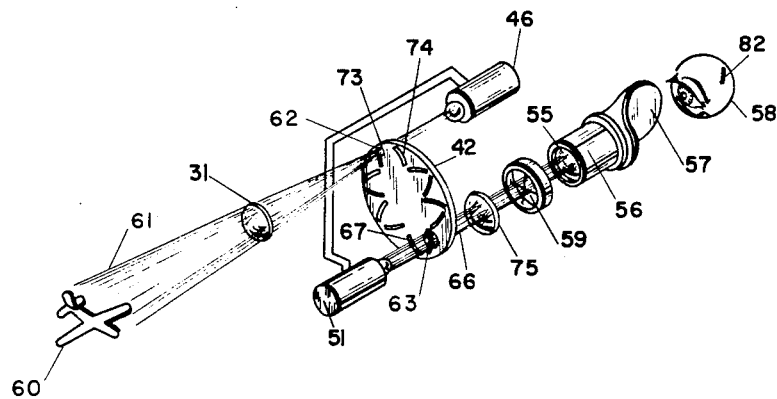

Fig. 8 shows the next significant position of the scanning disc. At this position, the rays 61 pass through the slit numbered 73 and impinge upon the detector. This radiation causes the detector to send a signal to the amplifier, and lights the slit illuminating lamp. Since there is a slit 63 just opposite the illuminating lamp, and in a position corresponding to that of the slit 73 in the field of the objective lens, a slit of light passes to the eyepiece which has precisely the same orientation in the field as does the light from the target in the field of the objective lens.

When the illuminated reticle is used, the image of its cross-mark is also seen in the partially reflecting mirror, as well as the image from the slit which passes through the mirror.

The reference reticle means of Fig. 6 simply provides a visible cross-mark which will occupy the same position as the cross-mark from the reticle shown in Fig. 1. Therefore, this simplified reticle arrangement is shown in the schematic drawings of Figs. 7-10. The cross-marks provide a means for centering the gun sight.

Figure 9:
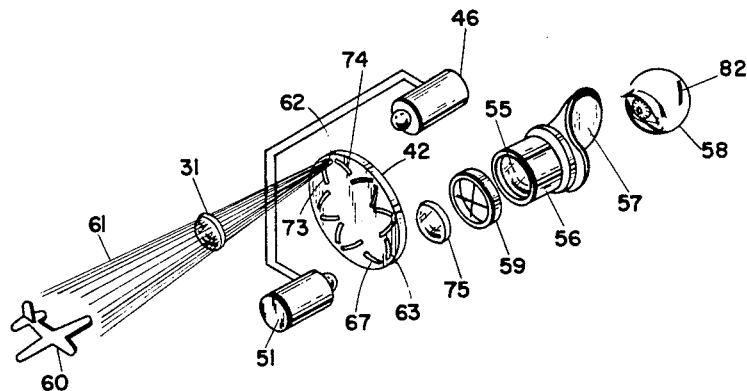

Fig. 9 shows the next significant position, in which the scanning disc has rotated still further, and the rays 61 again fall on an imperforate part of the scanning disc. Slits 73 and 63 have moved away from the axes of the optical system. Therefore no energy reaches the detector, and slit illuminating lamp is not lighted. However, at this time, due to persistency of vision, the eye 58 retains the image 82 seen when the scanning disc was in the position of Fig. 8.

Figure 10:
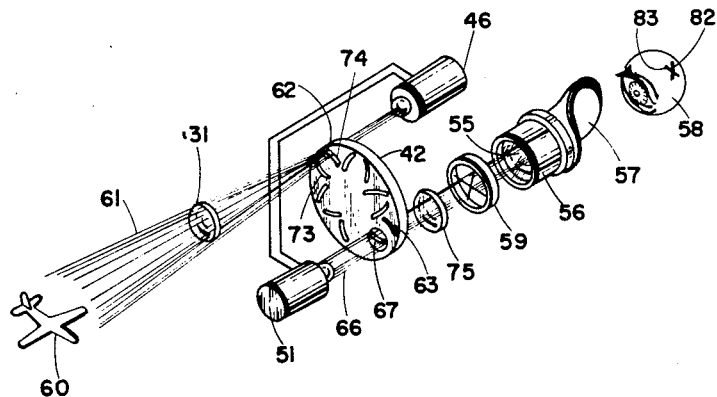

Fig. 10 shows the next significant position, where slit 74 has reached the spot 62, and radiant energy passes through the reticle. This again excites the detector and turns on the slit illuminating lamp so that rays 66 shine through aligned slit 67 to fall upon the eye 58. This provides another image to the observer, and because of the relative orientation of the slits on the disc this new image 83 and the image 82 retained from the reticle position of Fig. 8, combine to present a cross in the observed field to the observer, the center of which appears to be at the location of the target in the field.

The embodiment shown in Fig. 11 illustrates an arrangement by which two synchronized moving reticles are provided to give greater flexibility to the location of the two optical paths. When the motor 79 turns the shaft 78 and the reticle discs 76 and 77, the slits 65 pass across the optical paths of the detected energy and of the visible light from the slit illuminating lamp in the same manner as the slits 43 of scanning disc 42 in Fig. 5, so as to control the passage of detected energy to the detector, and the passage of visible light to the eyepiece. In all particulars, except the provision of the moving reticle in two parts so as to provide a different orientation of optical paths, the design and operation of the embodiment of Fig. 11 are the same as those of the embodiment shown in Fig. 5.

There is thus provided by this invention a means for sighting on an object which radiates or reflects radiant energy. This energy may be either visible or invisible, although the devices shown are principally useful for tracking objects invisible to the eye. The detection of warm bodies which radiate infrared energy is a good example.

While the device has been shown as producing a visible image such as a bright spot, or an illuminated cross, it will be understood that the invention can be utilized by selectively dimming a part of the field, or by changing the color of part of the field, instead of brightening it, or by other variations which are well within the ability of persons skilled in the art to devise.

This device provides a convenient image conversion from a presentation in one form of detected energy to another more useful form. Of course, the viewed image does not necessarily have the contours of the object being viewed. However, the location of the object in the field is presented, which is sufficient for many practical purposes.

The manufacturing tolerances need not be exceptionally precise for the embodiment of Fig. 1. With respect to the embodiments of Figs. 5 and 11, the discs, once perforated and synchronized, will always present synchronized slots to the optical paths. Therefore, once the optical paths are aligned with the moving reticle or reticles, there is no further problem of image registration, and the registration problems, inherent in previous types of scanning systems are largely eliminated.

This invention is not to be limited to the embodiments shown in the drawings and described in the description, which are given by way of example, and not of limitation, but only in accordance with the scope of the appended claims.

I claim:
1. A device for transforming an image of infrared waves to a similar image of visible light waves, said device having an optical central axis, comprising means for forming an image in the device, an infrared detector for controlling an electric current when exposed to infrared waves, a moveable reticle between the infrared image source and the detector, said reticle having regions of its surface which are transparent to both infrared and visible waves, and regions of which are opaque thereto, means for moving the reticle, a source of visible light waves whose luminar intensity is modulated by the current from the detector disposed on the side of the reticle opposite the detector, and reflective means substantially transparent to infrared waves and substantially totally reflective of visible light waves disposed between the reticle and the detector at an angle to the optical central axis, the said means for forming an image, infrared detector, reticle, source of visible light, and reflective means being disposed along a single axis, whereby infrared and visible waves coincide through the reticle.

2. Apparatus according to claim 1 in which the reticle is substantially planar, having relatively small regions of its surface substantially completely transparent to the passage of both infrared and visible waves, and an approximately equal number of small regions substantially completely opaque to the passage of such waves, said opaque and transparent regions being distributed in a random manner over the surface of the reticle.

3. Apparatus according to claim 1 in which the reticle is substantially planar, having one set of strip-shaped transparent regions spaced equidistantly and parallel to each other and a second set of transparent strips spaced in the same manner as the first set, but disposed so as to make an angle with the first set.

4. A device for transforming an image of infrared waves to a similar image of visible light waves, said device having an optical central axis, comprising an entrance pupil for forming an image source of infrared waves, an infrared detector for controlling an electric current when exposed to infrared waves, a moveable reticle between the infrared source and the detector which reticle is substantially planar and having relatively small regions of its surface substantially completely transparent to the passage of both infrared and visible waves, and an approximately equal number of small regions substantially completely opaque to the passage of such waves, said opaque and transparent regions being distributed in a random manner over the surface of the reticle, means for moving the reticle in its own plane, a source of visible light waves whose luminar intensity is modulated by the current from the detector disposed on the side of the reticle opposite the detector, and a mirror disposed between the reticle and the detector which is substantially completely reflective of visible light waves and substantially transparent to infrared waves, said mirror being disposed at an angle to the optical central axis, the said entrance pupil, infrared detector, reticle, source of visible light waves, and mirror being disposed along the optical central axis, whereby infrared and visible waves coincide through the reticle.

5. Apparatus according to claim 4 in which the reticle is oscillated in its own plane and the mirror is disposed at an angle of 45° to the optical central axis of the device, whereby visible light is reflected to the side of said optical axis.

6. Apparatus according to claim 4 in which the reticle is moved so the small regions describe curved arcs in motion, and the mirror is disposed at an angle of 45° to the optical central axis of the system, whereby visible light is reflected to the side of said optical axis.

7. Apparatus according to claim 4 in which the reticle is oscillated in its own plane in substantially straight line motion, and the mirror comprises a germanium coating on a sheet of material transparent to infrared waves, the mirror being disposed at an angle of 45° to the optical central axis of the device whereby visible light is reflected to the side.

8. An optical system comprising receiving means for receiving radiant energy from an object, a radiation detector for detecting said received radiant energy from the object, a first optical path being formed between said receiving means and radiation detector for the radiant energy, a light source actuatable by said radiation detector to provide light rays, viewing means for viewing light rays from said light source, a second optical path being formed between said light source and viewing means for the light rays, said optical paths being separate from each other, and a rotatable reticle disposed in said first optical path and also in said second optical path, said movable reticle having transparent slits therethrough, said slits being formed in pairs with the members of each pair inclined toward each other, said pairs being spaced at equal angular intervals around the center of rotation of said reticle, and passing alternately through the first and second optical paths as the reticle is rotated, said slits being so disposed and arranged that when a slit occupies a position in said first optical path, there is also a slit correspondingly disposed in the second optical path, whereby when the reticle places a slit in the first optical path in the path of radiant energy from the object, radiant energy passes through said slit and impinges on the detector which thereupon actuates the light source to provide visible light, and said light then shines through said corresponding slit along the second optical path to the viewing means, and when the reticle means is so positioned that no slit is in said path of radiant energy from the object, the light source is not actuated, and no visible light rays pass through the movable reticle to the viewing means, whereby a visible image is produced at the viewing means at a location in the field of view in the second optical path corresponding to the position of the object with respect to the receiving means in the first optical path, the alternation of the slit in pairs providing the said image in the form of a cross which is centered at the location of the infrared rays in the field due, to the persistency of vision.

9. An optical system comprising receiving means for receiving radiant energy from an object, a radiation detector for detecting said received radiant energy from the object, a first optical path being formed between said receiving means and a radiation detector for the radiant energy, a light source actuatable by said radiation detector to provide light rays, viewing means for viewing light rays from said light source, a second optical path being formed between said light source and said viewing means for the light rays, said optical paths being separate from each other, a first rotatable reticle means disposed in said first optical path, said first rotatable reticle means having portions which are conductive of radiant energy and portions which are not conductive of radiant energy, a second rotatable reticle means disposed in said second optical path, said first and second reticle means being rotated together in synchronism, said second rotatable reticle means having transparent slits therethrough, said slits being formed in pairs with the members of each pair inclined toward each other, said pairs being spaced at equal angular intervals around the center of rotation of said reticle, and passing through the second optical path as the reticle means are rotated, said slits being so disposed and arranged that when a slit occupies a position in said second optical path, there is also a portion of said first reticle means correspondingly disposed in the first optical path, whereby when a radiant energy conducting portion of the first reticle means is placed in the first optical path in the path of radiant energy from the object, radiant energy passes through said first reticle means and impinges on the detector which thereupon actuates the light source to provide visible light, and said light then shines through said corresponding slit along the second optical path to the viewing means, and when the first reticle means is so positioned that a non-radiant energy conducting portion is in said path of radiant energy from the object, the light source is not actuated and no visible light rays pass through the second movable reticle means to the viewing means, whereby a visible image is produced at the viewing means at a location in the field of view in the second optical path corresponding to the position of the object with respect to the receiving means in the first optical path, the alternation of the slit in pairs in said second reticle means providing the said image in the form of a cross which is centered at the location of the infrared rays in the field, due to the persistency of vision of an observer.

10. An optical system comprising receiving means for receiving radiant energy from an object, a radiation detector for detecting said received radiant energy from the object, a first optical path being formed between said receiving means and radiation detector for the radiant energy, a light source actuatable by said radiation detector to provide light rays, viewing means for viewing light rays from said light source, a second optical path being formed between said light source and viewing means for the light rays, said optical paths being separate from each other, rotatable reticle means disposed in said first optical path and also in said second optical path, said rotatable reticle means having transparent slits therethrough, said slits being formed in pairs with the members of each pair inclined toward each other, said pairs being spaced at equal angular intervals around the center of rotation of said reticle means, and passing through the first and second optical paths as the reticle means are rotated, said slits being so disposed and arranged that when a slit occupies a position in said first optical path, there is also a slit correspondingly disposed in the second optical path, whereby when the reticle means places a slit in the first optical path in the path of radiant energy from the object, radiant energy passes through said slit and impinges on the detector which thereupon actuates the light source to provide visible light, and said light then shines through said corresponding slit along the second optical path to the viewing means, and when the reticle means is so positioned that no slit is in the said path of radiant energy from the object, the light source is not actuated, and no visible light rays pass through the movable reticle means to the viewing means, whereby a visible image is produced at the viewing means at a location in the field of view in the second optical path corresponding to the position of the object with respect to the receiving means in the first optical path, the alternation of the slit in pairs providing the said image in the form of a cross which is centered at the location of the infra-red rays in the field due to the persistency of vision of an observer.

References Cited in the file of this patent
UNITED STATES PATENTS

| | | |
|---|---|---|
| 1,781,799 | Baird | Nov. 18, 1930 |
| 2,028,475 | Rockwell | Jan. 21, 1936 |
| 2,225,097 | Cawley | Dec. 17, 1940 |